United States Patent
McArthur

(10) Patent No.: US 6,219,526 B1
(45) Date of Patent: Apr. 17, 2001

(54) METHOD AND APPARATUS FOR GENERATING A SATELLITE CONTROL STRATEGY

(75) Inventor: Monica McArthur, Los Angeles, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/106,835

(22) Filed: Jun. 30, 1998

(51) Int. Cl.[7] .................................................... H04B 7/185
(52) U.S. Cl. .......................................... 455/12.1; 345/327
(58) Field of Search ............................ 455/12.1; 345/327

(56) References Cited

U.S. PATENT DOCUMENTS 6,081,263 * 6/2000 LeGall et al. ......................... 345/327

OTHER PUBLICATIONS

The United States House of Representatives Select Committee on U.S. National Security and Military/Commercial Concerns with the People's Republic of China, Chapter 5, Jan. 3, 1999.*

* cited by examiner

Primary Examiner—William Cumming
(74) Attorney, Agent, or Firm—T. Gudmestad

(57) ABSTRACT

A system and method for generating a satellite commanding procedure includes a computer having a central processing unit and a screen display coupled to the computer. The display has a plurality of object-oriented display indicia. An input device is coupled to the computer and is used for entering a plurality of arguments into the computer. A stub generator operating within the computer receives the arguments and generates a stub. A mission tool kit has a plurality of stored commands. A program memory stores the satellite commanding procedure. The computer associates the stub with the procedure steps and stores the procedure steps in program memory. When the satellite commanding procedure is run or tested, a mediator is used to recognize the stub and recall the procedure steps and arguments associated with the screen indicia.

17 Claims, 2 Drawing Sheets

METHOD AND APPARATUS FOR GENERATING A SATELLITE CONTROL STRATEGY

TECHNICAL FIELD

The present invention relates to controlling satellites, and more particularly, to a method and apparatus for developing a satellite commanding procedure.

BACKGROUND ART

A ground station controls the deployment and other satellite commanding procedures when the satellite is launched into space. A satellite commanding procedure may have a number of satellite commanding functions. Each satellite commanding function has a number of procedure steps associated therewith. Each procedure steps have a number of arguments associated therewith such as the timing for the certain events.

Satellite commanding functions such as firing bolt cutters, performing turning sequences or other operations are initiated according to the satellite commanding procedure in the ground station. The satellite commanding procedure with its associated satellite commanding functions is developed before the satellite is launched to allow verification of the satellite commanding procedure.

One method that is used to develop satellite commanding procedures is a commercially available program called a mission tool kit. One function of the mission tool kit is to verify that it is possible to associate various checks with a given command in the procedure. The programming language results in a lengthy difficult to understand program. One drawback with such a method for developing a satellite commanding procedure is that the operation of the program cannot be verified in real time, which is highly desirable for satellite program development. That is, before the satellite is deployed a check of the satellite commanding procedure is executed to verify operation. Previously, real time procedures could not be run.

Another drawback to the prior manner in which commanding procedures are implemented is that not all relevant information is displayed on the screen. In addition, the actual lines of code are lengthy, making it difficult and time consuming to determine the course of the procedure.

SUMMARY OF THE INVENTION

It is therefore one object of the invention to provide an easier method for developing a satellite commanding procedure. It is a further object of the invention to provide a means to check the state of the commanding procedures in real time prior to operation on the satellite.

In one aspect of the invention, a method and apparatus for developing a satellite commanding procedure comprises the steps of entering a plurality of arguments to be associated with a screen indicator object, passing the arguments and the satellite commanding function through a stub generator, and generating a stub as a function of the satellite commanding function and the plurality of arguments. The method further includes the steps of adding the satellite commanding function, arguments and procedure steps to a satellite commanding procedure, initiating operation of the satellite commanding procedure, calling a mediator with various arguments which recalls a stub associated with a satellite commanding function, and, directing the procedure to recall the procedure steps and arguments in response to the stub.

In a further aspect of the invention, a system for generating a satellite commanding procedure includes a computer having a central processing unit and a screen display coupled to the computer. The display has a plurality of object-oriented display indicia. An input device is coupled to the computer. The input device is used to enter a plurality of arguments into the computer. A stub generator operating with the computer receives the arguments and generates a stub. A mission tool kit has a plurality of stored commands. A program memory stores the satellite commanding procedure. The computer associates the stub with a procedure and stores the procedure in the program memory.

One advantage of the invention is that the operator of the ground station may readily observe and understand the procedure as it is being tested and executed. Another advantage of the invention is that development costs have been lowered to due the ease of use and reuse, the ease of programming satellite commanding procedures and the ease of maintainability.

Other objects and features of the present invention will become apparent when viewed in light of the detailed description of the preferred embodiment when taken in conjunction with the attached drawings and appended claims.

BEST MODE(S) FOR CARRYING OUT THE INVENTION

Figure 1:
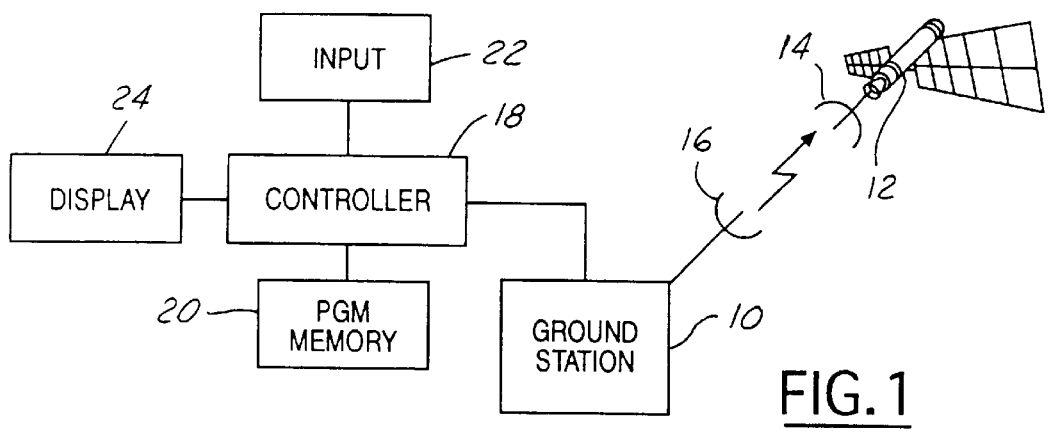
FIG. 1 is a view of a satellite with respect to a ground station in which the present invention is applicable.

Referring to FIG. 1, a ground station 10 is used to communicate with a satellite 12. Satellite 12 has a satellite antenna 14. Ground station 10 has a ground antenna 16. Communication between satellite 12 and ground station 10 is performed through antennas 14 and 16.

Communications from ground station 10 serve various functions. For example, after satellite 12 is launched, ground station 10 initiates deployment commands. The deployment commands tell satellite 12 when to perform certain maneuvers to allow satellite 12 to properly position itself in orbit. Deployment commands, for example, include pyrotechnic firing for bolt cutting, and positioning of reflectors.

The relevant portions of ground station 10 are a controller 18, a program memory 20, an input device 22, and a display 24. Controller 18 is preferably a microprocessor-based controller. Controller 18 may, for example, be a personal computer. Among other things, controller 18 operates according to a program memory 20 and inputs from input device 22.

Program memory 20 may be a variety of types of memories including a magnetic or optical disc or a Random Access Memory (RAM). The programs to be stored in memory 20 will typically be programmed and tested in a different location before being implemented in ground control station 10.

Input device 22 may, for example, be a keyboard or other peripheral device.

Display 24 may be a monitor screen or other display device suitable for conveying information to the user.

Figure 2:
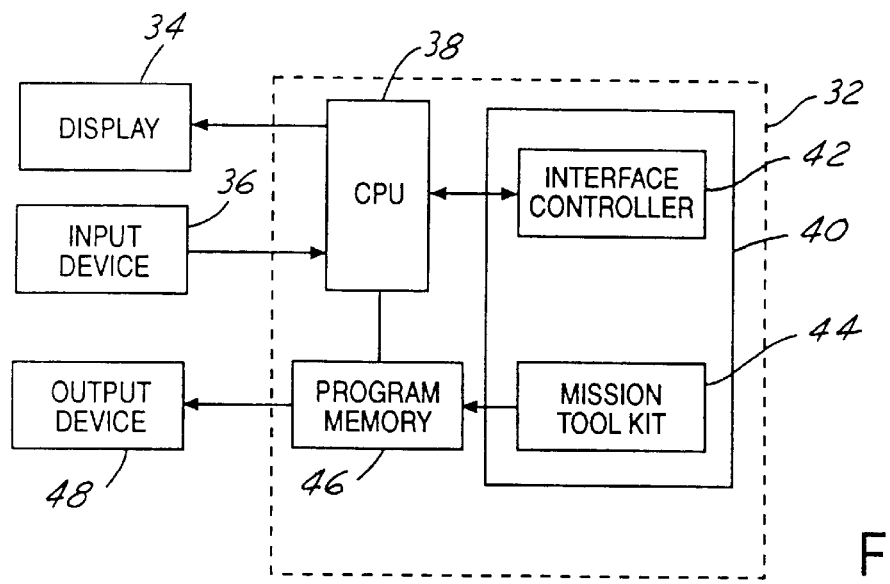
FIG. 2 is a block diagram of a system according to the present invention.

Referring now to FIG. 2, a block diagram for a system 30 used for programming a satellite commanding procedure is illustrated. Generally, a computer 32 is used to program and test deployment procedures. Computer 32 may also control the actual deployment of the satellite. Computer 32 is illustrated for simplicity as a single computer, however, one skilled in the art would recognize that several interlinked computers may be used to perform the various functions.

Computer 32 is coupled to a screen display 34 and an input device 36. Display 34 may be similar to that described above. That is, display 34 may be a monitor screen or other display device suitable for conveying information to the user of computer 32. Input device 36 may also be similar to that described above. That is, input device 34 may be a keyboard or other peripheral device.

Computer 32 has a central processing unit (CPU) 38. CPU 38 is a microprocessor-based unit that controls the inner operation of computer 32.

In addition to its fundamental inner components, computer 32 also has a real-time object-oriented control system 40. Control system 40 is a control system that allows object-oriented programming. Control system 40 may be one of a number of commercially available control systems 40 such as "G2". Control system 40 is a software-based system stored in an associated memory. Control system 40 has a programming language for entering instruction commands.

Control system 40 has an interface controller 42 and a mission tool kit 44. Interface controller 42 controls the interaction between tool kit 44 and display 34 as will be further described below.

Mission tool kit 44 may be one of a variety of commercially available tool kits such as the Intelligent Mission Toolkit (IMT) by Storm Control Systems of Herndon, Va. To interface with mission tool kit 44, the programming language and the user interface of control system 40 is used. Mission tool kit 44 has a plurality of procedures and checks for various satellite commanding functions. IMT was developed with the G2 program described above. This facilitates interaction with control system 40.

IMT was commonly used alone. IMT was not developed to function as an object-oriented method for programming. Consequently, many of the procedure steps for a satellite commanding function had to be programmed in minute and time-consuming detail. That is, the various repetitive lines of individual code associated with the procedure steps are programmed and displayed. The screen display, thus, becomes cluttered with multiple lines of code.

In developing the satellite commanding procedures, the power of the object-oriented control system is harnessed. A satellite commanding procedure is formed and stored in program memory 46. Satellite commanding procedure is formed of a number of satellite commanding functions. Each satellite commanding function is formed from a number of procedure steps. Each procedure step has a plurality of arguments such as timing and other parameters associated therewith. The satellite commanding procedure may be transferred to another computer for testing the satellite commanding procedure or for deployment of a satellite. An output device 48 such as a disk drive may be used to store and transfer the deployment program.

Figure 3:
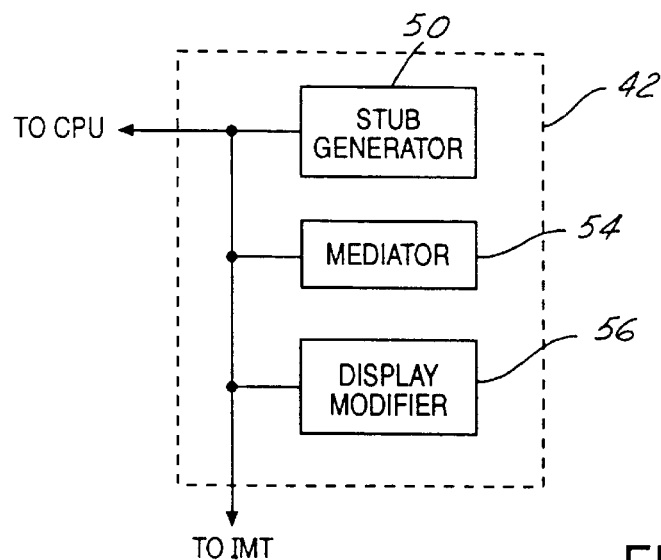
FIG. 3 is a block diagram of an interface controller according to the present invention.

Referring now to FIG. 3, interface controller 42 performs various functions. Interface controller 42 has a stub generator 50, a mediator 54 and a display modifier 56.

In general, the present invention reduces the effort to program a satellite commanding procedure by reducing the number of operator inputs. Stub is used by mediator 54 to call the procedures steps. Each of the procedure steps has a variety of arguments that must be entered for each satellite commanding function. The procedure developer is asked for the variety of arguments based on the satellite commanding function to be operated.

Stub generator 50 generates a stub as a function of satellite commanding function and arguments. The stub becomes associated with the satellite commanding function. The stub is essentially a code identifier. Stubs are automatically generated when the satellite commanding function and arguments are entered. Each set of satellite commanding functions and its associated arguments has a unique stub.

Mediator 54 is used when the satellite commanding procedure is run and tested. Mediator 54 calls the stub. The stub directs the satellite commanding procedure to obtain the proper procedure from mission toolkit 44 with cooresponding proper arguments.

During programming, running and testing, a display modifier 56 updates the screen display based upon the procedure to be run.

If the first set of data is not within predetermined guidelines as determined by mission toolkit 44, information such as a warning may be directed to screen display. In the alternative, the information may be passed to object controller 42.

Figure 4:
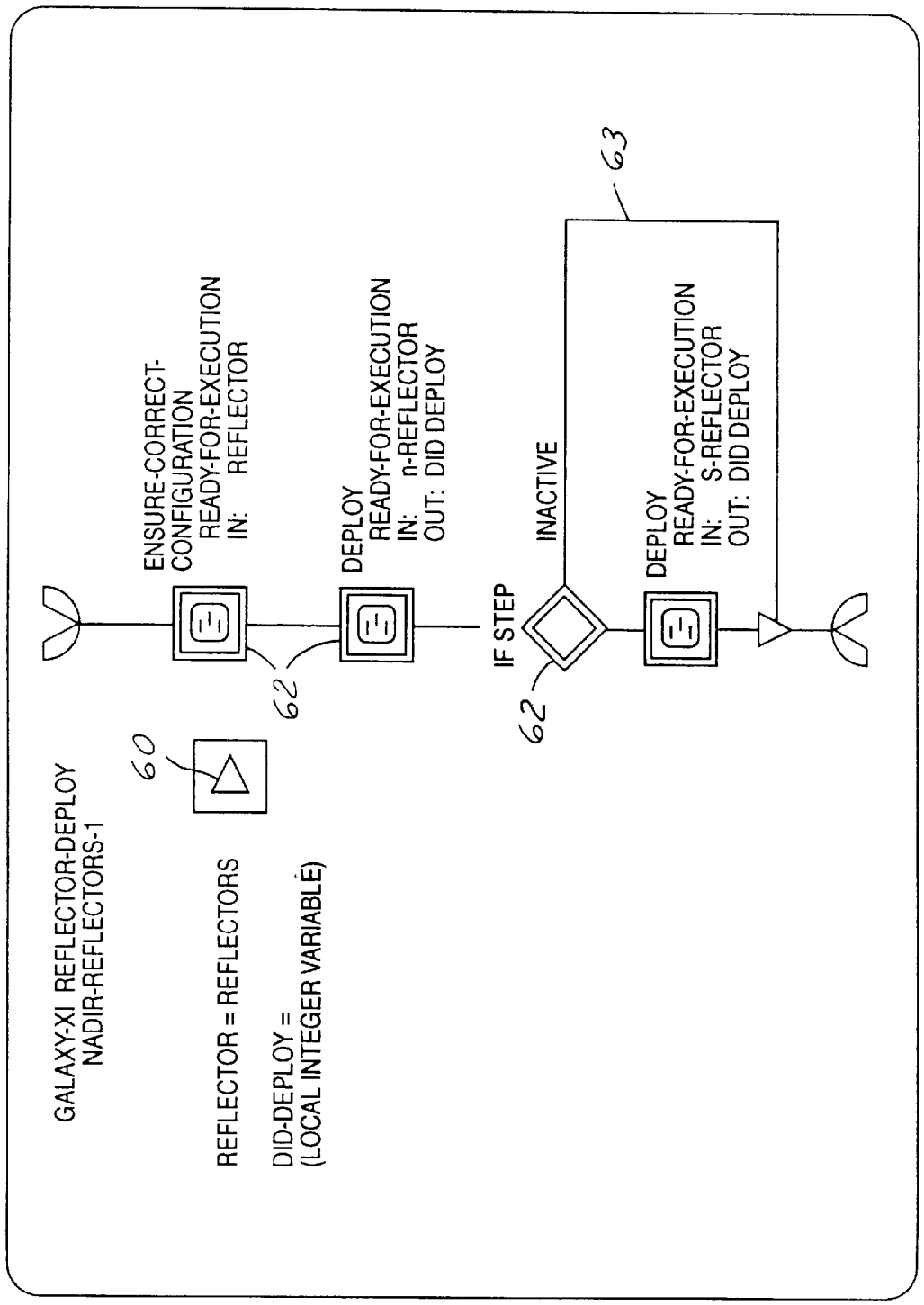
FIG. 4 is a screen layout of a satellite commanding function of a satellite commanding procedure developed according to the present invention.

Referring now to FIG. 4, one example of a display screen having a plurality of screen indicia such as indicator objects 62 are shown. Screen indicator objects 62 may vary greatly depending on the satellite commanding function. The screen illustrated is displayed in the run or test mode of the program. A similar screen is displayed when operating in program mode. Indicator objects 62 may represent a plurality of procedural steps or actual lines of code being operated. Other screen indicia may include lines 63 illustrating the flow of the procedure steps. Of course, other screen indicia such as the name of the satellite commanding function and the various arguments associated with the procedure may be displayed.

Display modifier 56 controls a pointer 60. Pointer 60 provides a visual indication as to which portion of the procedures is being performed during operation or testing.

There are two modes as described above. First, the desired satellite commanding procedure with the satellite commanding functions must be programmed into the system. Second, the program is run and tested. The run mode is also used by the ground operator to deploy the satellite.

In the programming mode, the operator initiates the real-time object-oriented control system. The first satellite commanding function is displayed on the screen. Indicator objects 62 are displayed that correspond to the various procedure steps. Program pointer 60 moves according to the corresponding procedural steps.

Mission tool kit may insert a number of checks into a satellite commanding function being programmed. These checks may, for example, check the operating parameters of the program. Further, the checks may check data received during the actual deployment of the satellite and compare the received data with the operating parameters. If the received data is out of range from the operating parameters, the deployment operation can be warned via a screen warning so that corrective measures may be performed.

During operation in either run or programming mode, mission tool kit 44 may be used to check the operating conditions to ensure that the functions performed are within the desired range. As the satellite commanding function is being programmed, screen indicia may appear to indicate the procedure steps rather hat the individual lines of code associated therewith.

Once a procedure is selected in the run or test mode, the desired procedure steps and arguments are recalled through the direction of mediator. The display will be updated throughout the process.

While particular embodiments of the invention have been shown and described, numerous variations and alternate embodiments will occur to those skilled in the art. Accordingly, it is intended that the invention be limited only in terms of the appended claims.

What is claimed is:

1. A method for developing a satellite commanding procedure comprising the steps of: entering a plurality of arguments to be associated with a screen display indicia;

passing the arguments and the satellite commanding function through a stub generator;

generating a stub as a function of the satellite commanding function and the plurality of arguments;

adding the satellite commanding function, arguments and procedure steps to a satellite commanding procedure;

initiating operation of the satellite commanding procedure;

calling a mediator with the plurality of arguments;

recalling the stub associated with a satellite commanding function through the mediator; and recalling the procedure steps and arguments in response to the stub.

2. A method as recited in claim 1 further comprising the steps of generating a plurality of objects corresponding to a desired satellite function, the satellite function has a plurality of arguments associated therewith.

3. A method as recited in claim 1 further comprising the steps of inserting a plurality of checks into the satellite commanding function.

4. A method as recited in claim 1 further comprising the step of revising the screen indicator objects in response to the checks.

5. A method as recited in claim 1 further comprising the step of verifying that the arguments are within a desired range.

6. A method as recited in claim 1 further comprising the step of updating the display indicia in response to various data.

7. A method as recited in claim 1 further comprising the steps of controlling a satellite commanding function in response to the stub.

8. A method for developing a satellite commanding procedure comprising the steps of:

associating a predetermined set of satellite commanding functions with screen indicator objects, each of the satellite commanding functions having a plurality of procedure steps associated therewith;

entering a plurality of arguments to be associated with the screen indicator objects;

passing the arguments and the satellite commanding function through a stub generator;

generating a stub as a function of the satellite commanding function and the plurality of arguments;

adding the satellite commanding function, arguments and procedure steps to a satellite commanding procedure;

initiating operation of the satellite commanding procedure;

calling a mediator with the plurality of arguments;

recalling the stub associated with a satellite commanding function through a mediator; and recalling the procedure steps and arguments in response to the stub; and moving the pointer as the procedure is performed.

9. A method as recited in claim 8 wherein the step of recalling the procedure steps and arguments comprises the step of recalling the procedure step and arguments through a mediator.

10. A method as recited in claim 8 further comprising the steps of generating a plurality of objects corresponding to a desired satellite function, the satellite function has a plurality of arguments associated therewith.

11. A method as recited in claim 8 further comprising the steps of inserting a plurality of checks into the procedure.

12. A method as recited in claim 8 further comprising the step of revising the screen indicator objects in response to the checks.

13. A method as recited in claim 8 further comprising the step of verifying that the arguments are within a desired range.

14. A method as recited in claim 8 further comprising the step of updating the display indicia in response to various data.

15. A method as recited in claim 8 further comprising the steps of controlling a satellite commanding function in response to the stub.

16. A system for generating a satellite commanding procedure comprising:

a computer having a central processing unit;

a screen display coupled to said computer, said display having a plurality of object-oriented display indicia;

an input device coupled to said computer, said input device entering a plurality of arguments into said computer;

an object-oriented control system having, a stub generator operating with said computer receiving said arguments and generating a stub;

a mediator for identifying said stub; and a mission tool kit having a plurality of stored commands; and a program memory for storing said satellite commanding procedure, said computer associating the stub with a procedure and storing the procedure in said program memory.

17. A system as recited in claim 16 wherein said computer generating a display pointer, said computer moving said display pointer in response to said procedure.

* * * * *